US012562862B2

(12) United States Patent
Gao et al.

(10) Patent No.: US 12,562,862 B2
(45) Date of Patent: Feb. 24, 2026

(54) TRANSMISSION AND RECEPTION OF DOWNLINK CONTROL INFORMATION

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 275 days.

(21) Appl. No.: 17/631,112

(22) PCT Filed: Aug. 15, 2019

(86) PCT No.: PCT/CN2019/100862
§ 371 (c)(1),
(2) Date: Jan. 28, 2022

(87) PCT Pub. No.: WO2021/026912
PCT Pub. Date: Feb. 18, 2021

(65) Prior Publication Data
US 2022/0216965 A1      Jul. 7, 2022

(51) Int. Cl.
H04L 5/00 (2006.01)

(52) U.S. Cl.
CPC .................................. H04L 5/0051 (2013.01)

(58) Field of Classification Search
None
See application file for complete search history.

(56) References Cited

U.S. PATENT DOCUMENTS

2015/0049695 A1* 2/2015 Aiba ..................... H04L 1/0072
370/329
2017/0048734 A1* 2/2017 Kusashima ........... H04W 16/32
(Continued)

FOREIGN PATENT DOCUMENTS

CN          103369580 A      10/2013
CN          103858503 A      6/2014
(Continued)

OTHER PUBLICATIONS

3GPP Working Group Physical layer procedures for data 3GPP TS 38.214, V15.3.0, Sep. 30, 2018, pp. 1-96.
(Continued)

*Primary Examiner* — Phirin Sam
(74) *Attorney, Agent, or Firm* — Sughrue Mion, PLLC

(57) ABSTRACT

Embodiments of the present disclosure relate to methods, devices and computer readable media for transmission and reception of DCI in a single carrier based downlink control channel. A method of communication comprises receiving, at a terminal device, a reference signal for a downlink control channel associated with the terminal device via a first time-frequency resource allocated for transmission of the reference signal; determining, from a set of second time-frequency resources allocated for the downlink control channel, a subset of second time-frequency resources based on the reference signal; and receiving DCI via the subset of second time-frequency resources. The method further comprises determining, at a network device, the first and second time-frequency resources; determining the reference signal based on the second time-frequency resource; and transmitting the reference signal and DCI via the first and second time-frequency resources respectively. Embodiments of the present disclosure can reduce the complexity on blind detection for the downlink control channel while supporting low PAPR and better coverage with a single carrier based downlink control channel structure.

10 Claims, 6 Drawing Sheets

(56) References Cited

U.S. PATENT DOCUMENTS

| | | | | |
|---|---|---|---|---|
| 2017/0048749 | A1* | 2/2017 | Kim | H04W 72/541 |
| 2017/0134137 | A1* | 5/2017 | Kuchibhotla | H04L 5/0053 |
| 2017/0202025 | A1* | 7/2017 | Ouchi | H04W 74/0833 |
| 2017/0347270 | A1* | 11/2017 | Iouchi | H04L 5/0098 |
| 2019/0044669 | A1* | 2/2019 | Davydov | H04L 5/005 |
| 2019/0132807 | A1* | 5/2019 | Abedini | H04W 52/34 |
| 2019/0159185 | A1* | 5/2019 | Seo | H04L 5/0048 |
| 2019/0190579 | A1* | 6/2019 | Wang | H04L 27/2613 |
| 2019/0207663 | A1* | 7/2019 | Shimezawa | H04B 17/309 |
| 2019/0246424 | A1* | 8/2019 | Zhang | H04L 1/1671 |
| 2019/0335400 | A1* | 10/2019 | Gong | H04W 52/18 |
| 2019/0342061 | A1* | 11/2019 | Kim | H04L 5/10 |
| 2019/0350011 | A1* | 11/2019 | Li | H04W 74/004 |
| 2020/0076535 | A1* | 3/2020 | Xu | H04L 1/0057 |
| 2020/0120682 | A1* | 4/2020 | Li | H04L 1/1812 |
| 2020/0137736 | A1* | 4/2020 | Du | H04L 5/0053 |
| 2020/0235802 | A1* | 7/2020 | Nilsson | H04L 25/0226 |
| 2020/0252111 | A1* | 8/2020 | Maamari | H04L 5/0055 |
| 2021/0029705 | A1* | 1/2021 | Zhou | H04W 24/08 |
| 2021/0167922 | A1* | 6/2021 | Yamada | H04W 72/0446 |
| 2022/0116252 | A1* | 4/2022 | Xiong | H04L 27/261 |
| 2022/0167192 | A1* | 5/2022 | Lee | H04W 72/20 |
| 2022/0191077 | A1* | 6/2022 | Xue | H04L 5/0053 |
| 2022/0322328 | A1* | 10/2022 | Gulati | H04W 72/20 |
| 2022/0393811 | A1* | 12/2022 | Jiang | H04L 5/001 |
| 2022/0394705 | A1* | 12/2022 | Marinier | H04W 52/146 |
| 2022/0394722 | A1* | 12/2022 | Hwang | H04W 72/542 |
| 2023/0198704 | A1* | 6/2023 | Wu | H04W 36/18 370/329 |
| 2023/0199733 | A1* | 6/2023 | Kuchibhotla | H04L 5/0055 370/330 |
| 2023/0216621 | A1* | 7/2023 | Marinier | H04L 5/001 370/329 |

FOREIGN PATENT DOCUMENTS

| | | | |
|---|---|---|---|
| CN | 104285466 | A | 1/2015 |
| CN | 108024354 | A | 5/2018 |
| CN | 108631986 | A | 10/2018 |
| CN | 109150387 | A | 1/2019 |
| CN | 109392154 | A | 2/2019 |
| CN | 110050425 | A | 7/2019 |
| JP | 2015-508956 | A | 3/2015 |
| WO | 2018/021825 | A1 | 2/2018 |
| WO | 2018/059488 | A1 | 4/2018 |
| WO | 2018/127097 | A1 | 7/2018 |

OTHER PUBLICATIONS

International Search Report for PCT/CN2019/100862 dated May 13, 2020.

Written Opinion for PCT/CN2019/100862 dated May 13, 2020.

Japanese Office Action dated May 30, 2023 in Japanese Application No. 2022-509129.

Xinwei, "Discussion on remaining system information delivery", 3GPP TSG RAN WG1 NR Ad-Hoc #2, R1-1710841, Jun. 2017, China (4 pages total).

Communication issued Dec. 19, 2024 in Chinese Application No. 201980099353.2.

"A Cooperative Communication Strategy Based on OFDM", vol. 49, No. 2, 2009 (1 page).

"Status Report to TSG", 3GPP TSG RAN meeting #76, RP-171137, Jun. 5-8, 2017 (218 pages).

Communication issued May 20, 2025 in Chinese Application No. 201980099353.2.

* cited by examiner

100

110

120

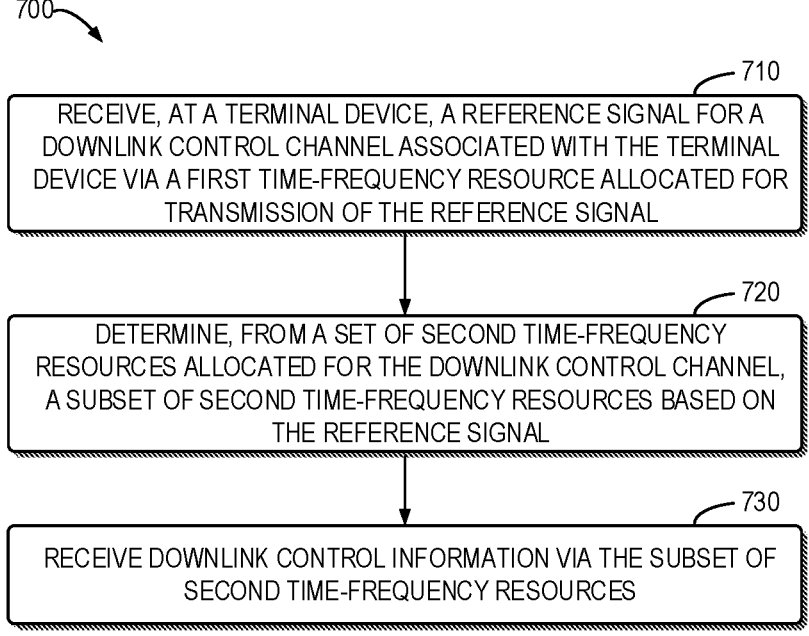

700

710

RECEIVE, AT A TERMINAL DEVICE, A REFERENCE SIGNAL FOR A DOWNLINK CONTROL CHANNEL ASSOCIATED WITH THE TERMINAL DEVICE VIA A FIRST TIME-FREQUENCY RESOURCE ALLOCATED FOR TRANSMISSION OF THE REFERENCE SIGNAL

720

DETERMINE, FROM A SET OF SECOND TIME-FREQUENCY RESOURCES ALLOCATED FOR THE DOWNLINK CONTROL CHANNEL, A SUBSET OF SECOND TIME-FREQUENCY RESOURCES BASED ON THE REFERENCE SIGNAL

730

RECEIVE DOWNLINK CONTROL INFORMATION VIA THE SUBSET OF SECOND TIME-FREQUENCY RESOURCES

FIG. 7

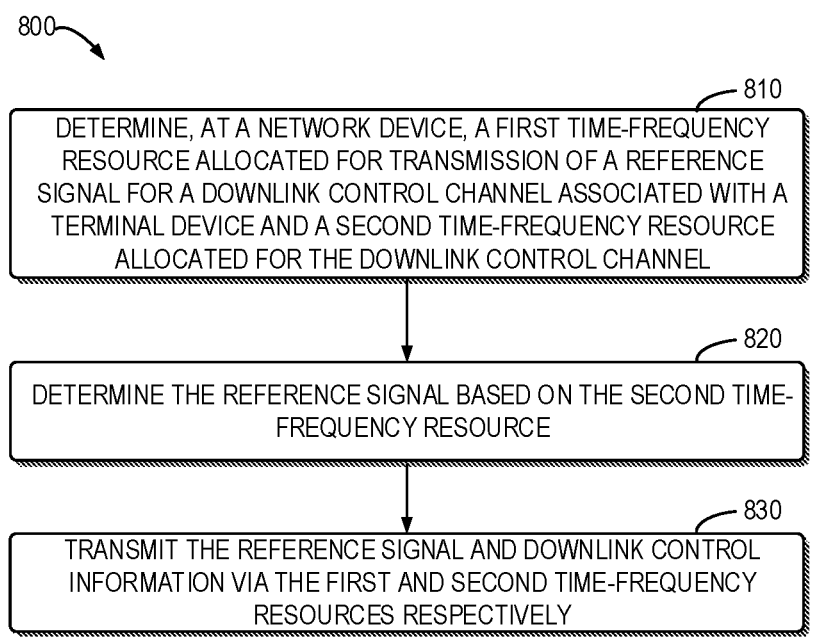

800

810
DETERMINE, AT A NETWORK DEVICE, A FIRST TIME-FREQUENCY RESOURCE ALLOCATED FOR TRANSMISSION OF A REFERENCE SIGNAL FOR A DOWNLINK CONTROL CHANNEL ASSOCIATED WITH A TERMINAL DEVICE AND A SECOND TIME-FREQUENCY RESOURCE ALLOCATED FOR THE DOWNLINK CONTROL CHANNEL

820
DETERMINE THE REFERENCE SIGNAL BASED ON THE SECOND TIME-FREQUENCY RESOURCE

830
TRANSMIT THE REFERENCE SIGNAL AND DOWNLINK CONTROL INFORMATION VIA THE FIRST AND SECOND TIME-FREQUENCY RESOURCES RESPECTIVELY

FIG. 8

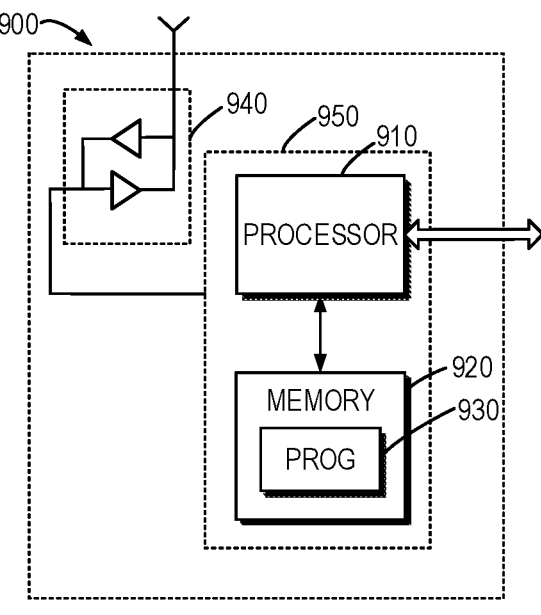

900

940      950      910

PROCESSOR

920
MEMORY

930
PROG

FIG. 9

TRANSMISSION AND RECEPTION OF DOWNLINK CONTROL INFORMATION

CROSS REFERENCE TO RELATED APPLICATIONS

This application is a National Stage of International Application No. PCT/CN2019/100862 filed Aug. 15, 2019.

TECHNICAL FIELD

Embodiments of the present disclosure generally relate to the field of telecommunication, and in particular, to methods, devices and computer storage media for transmission and reception of downlink control information (DCI).

BACKGROUND

In recent study on a new radio (NR) technology beyond 52.6 GHz, it is agreed that in a higher frequency band, a power amplifier (PA) with low power efficiency and a low coverage for a cell are critical to be solved, and a waveform with a low peak-to-average power ratio (PAPR) should be studied. In this case, a single carrier is considered to be used for downlink transmission due to its low PAPR of a time-domain signal sequence. Accordingly, a single carrier based downlink control channel such as a physical downlink control channel (PDCCH) is highly concerned.

SUMMARY

In general, embodiments of the present disclosure provide methods, devices and computer storage media for transmission and reception of DCI in a single carrier based downlink control channel.

In a first aspect, there is provided a method of communication. The method comprises: receiving, at a terminal device, a reference signal for a downlink control channel associated with the terminal device via a first time-frequency resource allocated for transmission of the reference signal; determining, from a set of second time-frequency resources allocated for the downlink control channel, a subset of second time-frequency resources based on the reference signal; and receiving downlink control information via the subset of second time-frequency resources.

In a second aspect, there is provided a method of communication. The method comprises: determining, at a network device, a first time-frequency resource allocated for transmission of a reference signal for a downlink control channel associated with a terminal device and a second time-frequency resource allocated for the downlink control channel; determining the reference signal based on the second time-frequency resource; and transmitting the reference signal and downlink control information via the first and second time-frequency resources respectively.

In a third aspect, there is provided a terminal device. The terminal device comprises a processor and a memory coupled to the processor. The memory stores instructions that when executed by the processor, cause the terminal device to perform the method according to the first aspect of the present disclosure.

In a fourth aspect, there is provided a network device. The network device comprises a processor and a memory coupled to the processor. The memory stores instructions that when executed by the processor, cause the network device to perform the method according to the second aspect of the present disclosure.

In a fifth aspect, there is provided a computer readable medium having instructions stored thereon. The instructions, when executed on at least one processor, cause the at least one processor to perform the method according to the first aspect of the present disclosure.

In a sixth aspect, there is provided a computer readable medium having instructions stored thereon. The instructions, when executed on at least one processor, cause the at least one processor to perform the method according to the second aspect of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein:

FIG. 7 illustrates an example method of communication implemented at a terminal device in accordance with some embodiments of the present disclosure;

FIG. 8 illustrates an example method of communication implemented at a network device in accordance with some embodiments of the present disclosure; and FIG. 9 is a simplified block diagram of a device that is suitable for implementing embodiments of the present disclosure.

Throughout the drawings, the same or similar reference numerals represent the same or similar element.

DETAILED DESCRIPTION

Figure 1:
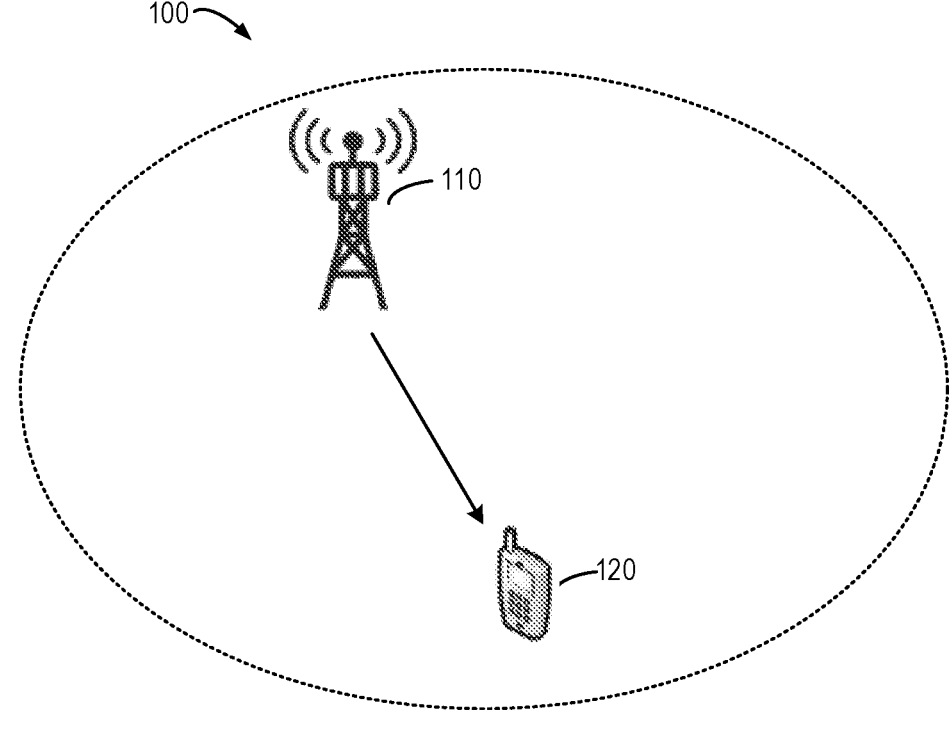
FIG. 1 illustrates an example communication network in which some embodiments of the present disclosure can be implemented.

Principle of the present disclosure will now be described with reference to some embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. The term "terminal device" can be used interchangeably with a UE, a mobile station, a subscriber station, a mobile terminal, a user terminal or a wireless device. In addition, the term "network device" refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission Reception Point (TRP), a Remote Radio Unit (RRU), a radio head (RH), a remote radio head (RRH), a low power node such as a femto node, a pico node, and the like.

In one embodiment, the terminal device may be connected with a first network device and a second network device. One of the first network device and the second network device may be a master node and the other one may be a secondary node. The first network device and the second network device may use different radio access technologies (RATs). In one embodiment, the first network device may be a first RAT device and the second network device may be a second RAT device. In one embodiment, the first RAT device is eNB and the second RAT device is gNB. Information related with different RATs may be transmitted to the terminal device from at least one of the first network device and the second network device. In one embodiment, a first information may be transmitted to the terminal device from the first network device and a second information may be transmitted to the terminal device from the second network device directly or via the first network device. In one embodiment, information related with configuration for the terminal device configured by the second network device may be transmitted from the second network device via the first network device. Information related with reconfiguration for the terminal device configured by the second network device may be transmitted to the terminal device from the second network device directly or via the first network device.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'one embodiment' and 'an embodiment' are to be read as 'at least one embodiment.' The term 'another embodiment' is to be read as 'at least one other embodiment.' The terms 'first,' and the like may refer to different or same objects. Other definitions, explicit and implicit, may be included below.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

As known, a concept of control resource set (CORESET) is introduced in a NR technology for carrying information such as the number of orthogonal frequency division multiplexing (OFDM) or single carrier symbols occupied in a time domain and a frequency band occupied in a frequency domain by downlink control channel such as a PDCCH. Further, a concept "search space" is employed to define possible downlink resource blocks for carrying the downlink control channel.

In case that a terminal device should receive DCI in the downlink control channel, a set of possible locations or time-frequency resources of the downlink control channel may be determined from the CORESET and search space, and the DCI may be determined by performing a blind detection process in the set of time-frequency resources. During the blind detection process, for each in the set of time-frequency resources, the terminal device may determine whether this time-frequency resource is desired or not by performing cyclic redundancy check (CRC), until the CRC succeeds and the desired time-frequency resource is determined. Thereby, the DCI can be obtained from the desired time-frequency resource.

In context of a single carrier based downlink control channel and in consideration with the above blind detection process, embodiments of the present disclosure provide an improved solution for transmission and reception of DCI, so as to reduce the complexity on blind detection for a downlink control channel while supporting low PAPR and better coverage with a single carrier based downlink control channel structure. Principles and implementations of the present disclosure will be described in detail below with reference to the figures.

FIG. 1 illustrates a schematic diagram of an example communication network 100 in which embodiments of the present disclosure can be implemented. As shown in FIG. 1, the communication network 100 may include a network device 110 and a terminal device 120 served by the network device 110. It is to be understood that the number of devices in FIG. 1 is given for the purpose of illustration without suggesting any limitations to the present disclosure. The communication network 100 may include any suitable number of network devices and/or terminal devices adapted for implementing implementations of the present disclosure.

As shown in FIG. 1, the network device 110 may communicate with the terminal device 120 via a downlink channel such as a wireless communication downlink channel. For example, the network device 110 may transmit DCI to the terminal device 120 via a downlink control channel such as a PDCCH. Additionally, the network device 110 may transmit a reference signal to the terminal device 120 for channel evaluation and associated demodulation of downlink transmission. For example, the reference signal may be any one or more of a DMRS, a cell reference signal (CRS), a multicast broadcast single frequency network (MBSFN) reference signal, a positioning reference signal (PRS), and a channel state information-reference signal (CSI-RS). It should be note that the reference signal may be any downlink reference signal existing in the art or to be developed in the future.

The communications in the communication network 100 may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

Figure 2:
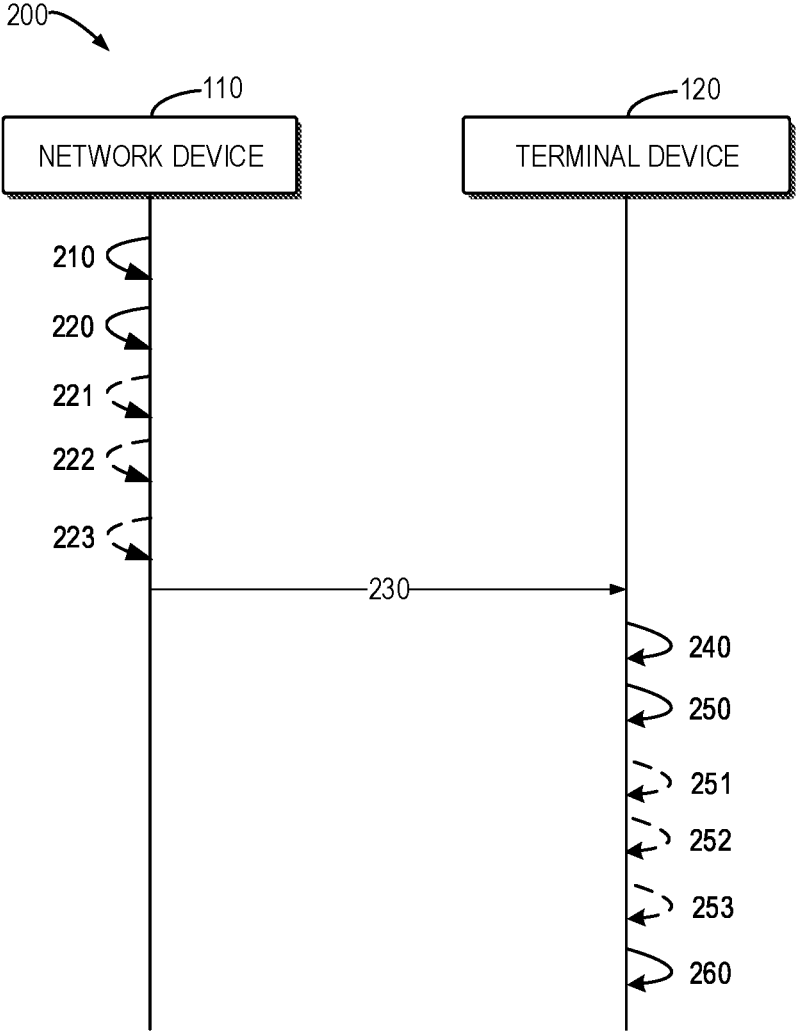
FIG. 2 illustrates a schematic diagram illustrating a process for transmission and reception of DCI in a single carrier based downlink control channel according to embodiments of the present disclosure.

FIG. 2 shows a schematic diagram illustrating a process 200 for transmission and reception of DCI in a single carrier based downlink control channel according to embodiments of the present disclosure. For the purpose of discussion, the process 200 will be described with reference to FIG. 1. The process 200 may involve the network device 110 and the terminal device 120 as illustrated in FIG. 1.

As shown in FIG. 2, the network device 110 may determine 210 a first time-frequency resource allocated for transmission of a reference signal for a downlink control channel associated with the terminal device 120 and a second time-frequency resource allocated for the downlink control channel. As discussed above, the reference signal may be any downlink reference signal existing in the art or to be developed in the future. For the purpose of discussion, the following description will be made by taking a DMRS as an example of the reference signal and taking a PDCCH as an example of the downlink control channel.

In some embodiments, the first and second time-frequency resources are predetermined. In some alternative embodiments, the first time-frequency resource may be selected from a set of first time-frequency resources allocated for transmission of the reference signal. In some alternative embodiments, the second time-frequency resource may be selected from a set of second time-frequency resources allocated for the downlink control channel. In this regard, an example is described in connection with FIG. 3.

Figure 3:
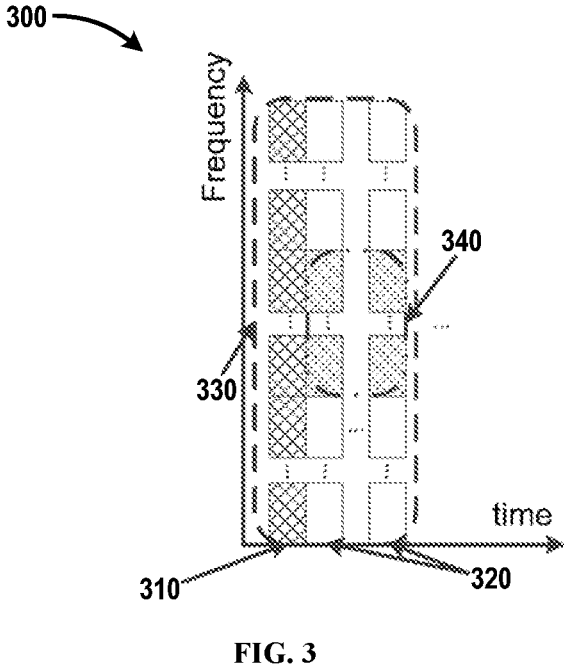
FIG. 3 illustrates a schematic time-frequency diagram illustrating data transmission in a single carrier based physical downlink control channel (PDCCH) associated with a terminal device according to some embodiments of the present disclosure.

FIG. 3 illustrates a schematic time-frequency diagram 300 illustrating data transmission in a single carrier based PDCCH associated with a terminal device according to some embodiments of the present disclosure. For the purpose of discussion, the diagram 300 will be described with reference to FIG. 1. The diagram 300 may involve the network device 110 and the terminal device 120 as illustrated in FIG. 1.

As shown in FIG. 3, time-frequency resources defined in a CORESET 330 are allocated to a terminal device (such as the terminal device 120), and the resources are used for PDCCH detection. A wideband DMRS is configured within all resource element groups (REGs) of a set of contiguous resource blocks (RBs) in the CORESET 330.

In some embodiments, the first symbol 310 of all RBs or REGs in a frequency range of the CORESET 330 is allocated for transmission of a DMRS of a PDCCH. The M symbols 320 subsequent to the first symbol 310 are allocated for the PDCCH, where M may be 1, 2 or 3. One in the set of second time-frequency resources associated with the terminal device 120 is shown by 340, and is also referred to as a PDCCH candidate herein.

In some embodiments, the DMRS is time-division multiplexed with the PDCCH. That is, there is no transmission of the PDCCH on the first symbol, and there is no transmission of the DMRS on the M symbols. In some embodiments, there may be a phase tracking reference signal (PTRS) frequency-division multiplexed on N of the M symbols, where $0 \leq N \leq M$. For example, the PTRS may be mapped on one or more of #1, #5, #9 resource elements (REs) within one physical resource block (PRB).

For example, in some embodiments, the network device 110 may configure X RBs in frequency domain and Y symbols in time domain to the terminal device 120, where X and Y are positive integers. For example, $1 \leq X \leq 400$, and $1 \leq Y \leq 4$. In some embodiments, the X RBs in frequency domain and Y symbols in time domain may be represented as the CORESET. In some embodiments, the network device 110 may transmit DCI in a PDCCH to the terminal device 120. In some embodiments, the PDCCH may be mapped within the time and frequency range of CORESET. In some embodiments, the PDCCH may be mapped to R resource blocks in frequency domain and S symbols in time domain, where R and S are positive integers, and $1 \leq R \leq X$, and $1 \leq S \leq Y$. In some embodiments, there is a reference signal associated with the PDCCH. For example, the reference signal may be a DMRS. In some embodiments, there is a sequence for transmission of the reference signal.

In some embodiments, there may be a parameter (also referred to as a second predetermined parameter herein) associated with the PDCCH. The parameter may comprise at least one of: an aggregation level, a starting index of control channel elements (CCEs), an index of search space set, an index of search space, an index of CORESET, an index of a PDCCH candidate. It should be note that the parameter for the PDCCH is not limited to the listed examples, and may be any other suitable parameter.

In some embodiments, there may be G possible values for the parameter associated with the PDCCH, where G is a positive integer and G>1.

In some embodiments, there may be a parameter (also referred to as a first predetermined parameter herein) of the sequence generation and/or resource mapping for the reference signal. The parameter may comprise at least one of: an index of the sequence of the reference signal, a length of the sequence of the reference signal, an initial value of the sequence of the reference signal, an index of a base sequence group for the sequence of the reference signal, an index of a base sequence within the base sequence group, and an RE offset for mapping of the sequence. It should be also note that the parameter of the sequence of the reference signal is not limited to the listed examples, and may be any other suitable parameter.

In some embodiments, there may be H possible values for the parameter of the sequence generation for the reference signal, where H is a positive integer and H>1.

In some embodiments, at least for two different values of the parameter associated with the PDCCH, the values of parameter of the sequence generation for the reference signal associated with the PDCCH may be different. In some embodiments, the two different values of the parameter associated with the PDCCH may be within a same CORESET. In some embodiments, the length of the sequences for the reference signal associated with the PDCCH with different values of parameters may be same.

In some embodiments, the parameter associated with the PDCCH may be one of the parameter for the sequence generation for the reference signal associated with the PDCCH.

In some embodiments, the G (where G is positive integer and G>1) possible values for the parameter associated with the PDCCH may be divided into F groups (where F is positive integer and 1<F≤G). In some embodiments, in different groups, the number of values may be same or different. In some embodiments, there may be no need of grouping of G values, or alternatively, there are G groups, and in each group, there is one value.

In some embodiments, there may be F and/or G different values of parameters of the sequence for reference signal associated with the PDCCH with F different groups and/or G different values of the parameter. And each value of parameter of the sequence for reference signal is associated with one group and/or value of the parameter for the PDCCH.

In some embodiments, the sequence for the reference signal may be $r_u^{(\alpha)}(n)=e^{j\alpha n}\bar{r}_u(n)$, $0 \leq n < M_{ZC}$, where $M_{ZC}$ is the length of the sequence, $\bar{r}_u(n)$ is the base sequence, $\alpha$ is the cyclic shift of the base sequence, $\mu$ is the index of sequence and/or sequence group. For example, a may be at least one value of {0, 1, 2, 3, 4, 5, 6, 7, 8, 9, 10, 11}.

In some embodiments, for the sequence generation for reference signal associated with the PDCCH, the value of cyclic shift and/or the value of sequence index and/or the value of sequence group index is based on the value of aggregation level.

In some embodiments, the RE offset of the resource mapping for the reference signal associated with the PDCCH may be at least one of {0, 1, 2, 3}. In some embodiments, for the resource mapping of reference signal associated with the PDCCH, the value of the RE offset is based on the value of aggregation level.

In some embodiments, for the PDCCH candidates within one CORESET, the number of values of aggregation level may be E. For example, E may be at least one of {1, 2, 3, 4, 5, 6, 7, 8}. For example, the value of aggregation level may be at least one of {1, 2, 4, 8, 16, 32, 64}. In some embodiments, the E different values of aggregation level of PDCCH may be associated with E different values of cyclic shift of a same base sequence for the reference signal. In some embodiments, the E different values of aggregation level of PDCCH may be associated with E different values of sequence and/or sequence group index for the reference signal. In some embodiments, the E different values of aggregation level of PDCCH may be associated with E different values of RE offset for the resource mapping of the reference signal.

Turn back to FIG. 2, the network device 110 may determine 220 the reference signal based on the second time-frequency resource. According to embodiments of the present disclosure as described above, different parameters of the reference signal may be associated with different parameters of the second time-frequency resource for the downlink control channel. In this way, the reference signal may carry some information about the second time-frequency resource, and upon demodulation of the reference signal, a range for a blind detection of the downlink control channel can be reduced, and an efficiency of the blind detection of the downlink control channel can be improved.

In some embodiments, the network device 110 may determine 221 a predetermined parameter (also referred to as a second predetermined parameter herein) of the second time-frequency resource. In some embodiments, the second predetermined parameter may comprise at least one of: an aggregation level of the second time-frequency resource, a starting index of CCEs for the second time-frequency resource, an index of the second time-frequency resource, an index of the set of the second time-frequency resources, an index of a search space associated with the terminal device 120, and an index of a set of search spaces associated with the terminal device 120. It should be note that the second predetermined parameter of the second time-frequency resource for the downlink control channel is not limited to the listed examples, and may be any other suitable parameter.

Upon determining the second predetermined parameter of the second time-frequency resource, the network device 110 may determine 222 a predetermined parameter (also referred to as a first predetermined parameter herein) of the reference signal based on the second predetermined parameter. In some embodiments, the first predetermined parameter may comprise at least one of: a sequence of the reference signal, a cyclic shift of the sequence of the reference signal, and a time-frequency resource of the reference signal. It should be note that the first predetermined parameter of the reference signal is not limited to the listed examples, and may be any other suitable parameter.

In some embodiments, the sequence of the reference signal may comprise at least one of: an index of the sequence of the reference signal, a length of the sequence of the reference signal, an initial value of the sequence of the reference signal, an index of a base sequence group for the sequence of the reference signal, an index of a base sequence within the base sequence group, and an RE offset for mapping of the sequence. It should be also note that the parameter of the sequence of the reference signal is not limited to the listed examples, and may be any other suitable parameter.

For example, assuming that different sequences of the reference signal are associated with different second time-frequency resources of the downlink control channel. The network device 120 may determine 221 an index of the second time-frequency resource of the downlink control channel, and may further determine 222 a corresponding sequence of the reference signal based on the determined index.

Figure 4:
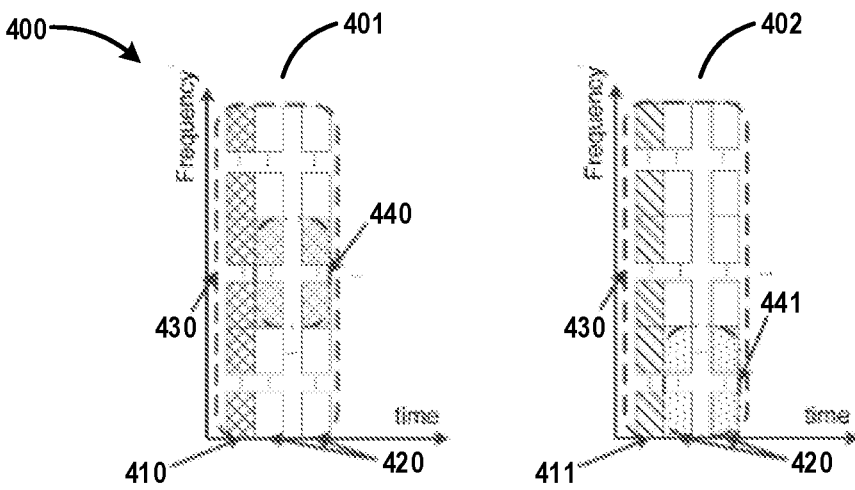
FIG. 4 illustrates a schematic time-frequency diagram illustrating an association of a sequence of a demodulation reference signal (DMRS) with a time-frequency resource (also referred to as second time-frequency resource below) for a PDCCH according to some embodiments of the present disclosure.

FIG. 4 illustrates a schematic time-frequency diagram 400 illustrating an association of a sequence of a DMRS with a time-frequency resource for a PDCCH according to some embodiments of the present disclosure. Reference signs 410 and 411 in FIG. 4 indicate a respective DMRS sequence carried by the first symbol, a reference sign 420 in FIG. 4 indicates DCI carried by the subsequent symbols, a reference sign 430 in FIG. 4 indicates a CORESET, and reference signs 440 and 441 in FIG. 4 indicate a respective PDCCH candidate. A time-frequency diagram 401 in FIG. 4 shows that a DMRS sequence 410 is associated with a PDCCH candidate 440, and a time-frequency diagram 402 in FIG. 4 shows that a further DMRS sequence 411 is associated with a further PDCCH candidate 441.

As another example, assuming that different sequences of the reference signal are associated with different aggregation levels of the second time-frequency resource of the downlink control channel. The network device 120 may determine 221 an aggregation level of the second time-frequency resource of the downlink control channel, and may further determine 222 a corresponding sequence of the reference signal based on the determined aggregation level.

Figure 5:
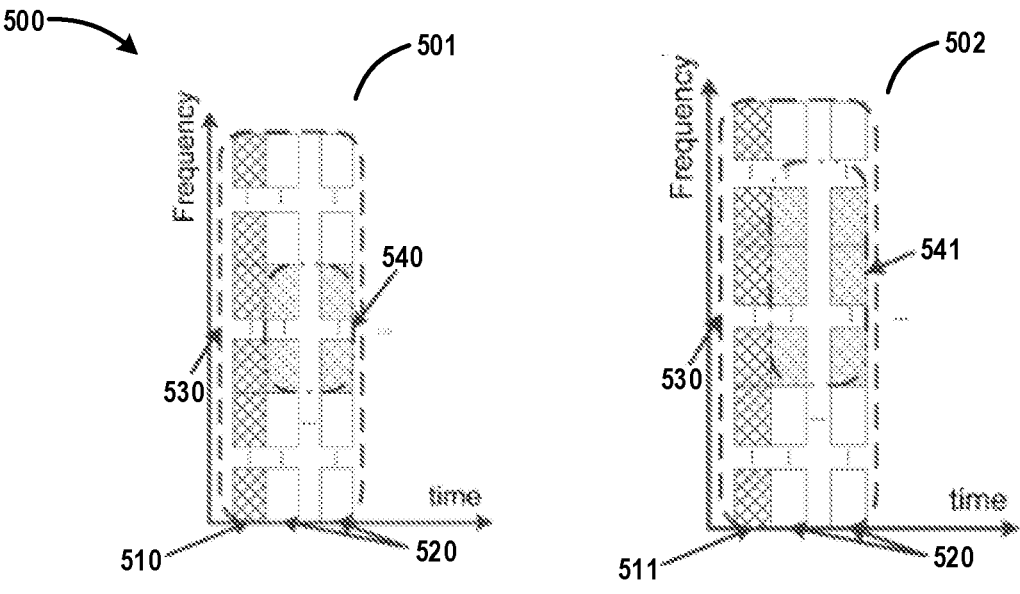
FIG. 5 illustrates a schematic time-frequency diagram illustrating an association of a sequence of a DMRS with an aggregation level of a time-frequency resource for a PDCCH according to some embodiments of the present disclosure.

FIG. 5 illustrates a schematic time-frequency diagram 500 illustrating an association of a sequence of a DMRS with an aggregation level of a time-frequency resource for a PDCCH according to some embodiments of the present disclosure. Reference signs 510 and 511 in FIG. 5 indicate a respective DMRS sequence carried by the first symbol, a reference sign 520 in FIG. 5 indicates DCI carried by the subsequent symbols, a reference sign 530 in FIG. 5 indicates a CORE-SET, and reference signs 540 and 541 in FIG. 5 indicate a PDCCH candidate having a respective aggregation level. A time-frequency diagram 501 in FIG. 5 shows that a DMRS sequence 510 is associated with a PDCCH candidate 540, and a time-frequency diagram 502 in FIG. 5 shows that a further DMRS sequence 511 is associated with a further PDCCH candidate 541.

As still another example, assuming that different time-frequency resources for the reference signal are associated with different time-frequency resources of the downlink control channel. The network device 120 may determine 221 an index of the second time-frequency resource of the downlink control channel, and may further determine 222 a corresponding index of the first time-frequency resource for the reference signal based on the index of the second time-frequency resource.

Figure 6:
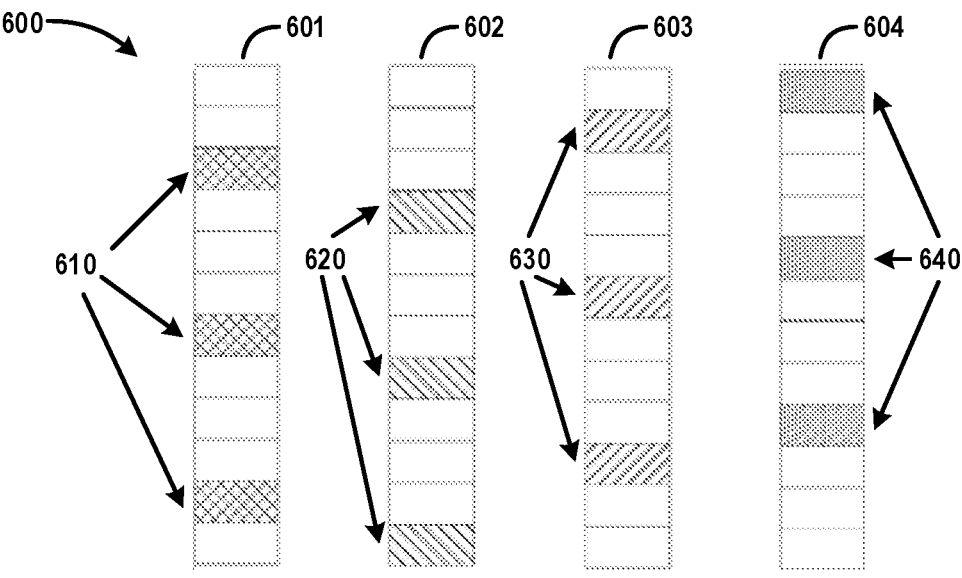
FIG. 6 illustrates a schematic time-frequency diagram illustrating an association of a first time-frequency resource for a DMRS with a second time-frequency resource for a PDCCH according to some embodiments of the present disclosure.

FIG. 6 illustrates a schematic time-frequency diagram 600 illustrating an association of a first time-frequency resource for a DMRS with a second time-frequency resource for a PDCCH according to some embodiments of the present disclosure. Reference signs 601-604 in FIG. 6 respectively indicate the first symbol carrying the DMRS. Reference signs 610-640 in FIG. 6 indicate different time-frequency resources for the DMRS. Time-frequency resources 610-640 are associated with different PDCCH candidates. It should be note that FIGS. 4-6 are merely examples for illustration, and the present disclosure is not limited by these examples, and many other implementations can be conceived based on the present disclosure.

Return to FIG. 2, upon determining the first predetermined parameter of the reference signal, the network device 110 may generate 223 the reference signal based on the first predetermined parameter. In some embodiments, the reference signal may be generated by transforming a base sequence according to the first predetermined parameter. For example, the base sequence may be a Zadoff-Chu (ZC) root sequence. In case of the above example, the reference signal may be generated by performing the corresponding cyclic shift for the ZC root sequence. It should be note that the base sequence of the reference signal is not limited to the listed example, and may be any other suitable sequence.

Upon determining the reference signal, the network device 110 may transmit 230 the reference signal and DCI via the first and second time-frequency resources respectively. In some embodiments, the network device 110 may time-division multiplex the reference signal with the DCI. For example, the network device 110 may transmit the reference signal on the first symbol and transmit the DCI on subsequent symbols, as discussed previously in connection with FIG. 3. It should be note that the transmission of the reference signal and DCI is not limited to the listed example, and may be carried out by any other suitable way.

Correspondingly, the terminal device 120 may receive 240 the reference signal. In some embodiments in which the first time-frequency resource is predetermined, the terminal device 120 may obtain the reference signal via the predetermined first time-frequency resource. In some embodiments in which a set of first time-frequency resources are allocated for transmission of the reference signal, the terminal device 120 may attempt to receive the reference signal from each of the set of first time-frequency resources, until the reference signal is correctly received.

Upon receiving the reference signal, the terminal device 120 may determine 250, from a set of second time-frequency resources allocated for the downlink control channel, a subset of second time-frequency resources based on the reference signal. As discussed above, the terminal device 120 may determine a set of second time-frequency resources based on information in the CORESET and search space associated with the terminal device 120, but the terminal device 120 does not know which second time-frequency resource carries DCI associated with it. Based on the received reference signal, the terminal device 120 may determine a subset of second time-frequency resources from the determined set of second time-frequency resources.

In some embodiments, the terminal device 120 may determine 251 the first predetermined parameter of the reference signal, and determine 252, based on the first predetermined parameter, a second predetermined parameter associated with the subset of second time-frequency resources. The association of the first predetermined parameter with the second predetermined parameter is similar with that described in processes 221 and 222 and FIGS. 4-6, and thus its detailed description is not repeated here.

Upon determining the second predetermined parameter associated with the subset of second time-frequency resources, the terminal device 120 may determine, from the set of second time-frequency resources, a second time-frequency resource having the second predetermined parameter as one in the subset of second time-frequency resources.

Upon determining the subset of second time-frequency resources, the terminal device 120 may receive 260 DCI via the subset of second time-frequency resources. In some embodiments, the terminal device 120 may attempt to receive the DCI associated with it from each of the subset of second time-frequency resources, until the DCI is correctly received.

According to the process in FIG. 2, a range of a blind detection of the downlink control channel associated with the terminal device 120 can be reduced, and complexity on the blind detection can also be reduced. In the meanwhile, with a single carrier based downlink control channel structure, a low PAPR and better coverage can be achieved.

Corresponding to the process described in FIG. 2, embodiments of the present disclosure provide methods of communication implemented at a terminal device and at a network device. These methods will be described below with reference to FIGS. 7 and 8.

FIG. 7 illustrates an example method 700 of communication implemented at a terminal device in accordance with some embodiments of the present disclosure. For example, the method 700 may be performed at the terminal device 120 as shown in FIG. 1. For the purpose of discussion, in the following, the method 700 will be described with reference to FIG. 1. It is to be understood that the method 700 may include additional blocks not shown and/or may omit some blocks as shown, and the scope of the present disclosure is not limited in this regard.

At block 710, the terminal device 120 may receive a reference signal for a downlink control channel associated with the terminal device via a first time-frequency resource allocated for transmission of the reference signal. In some embodiments, the reference signal may be a DMRS. In some alternative or additional embodiments, the reference signal may be any one or more of a cell reference signal (CRS), a multicast broadcast single frequency network (MBSFN) reference signal, a positioning reference signal (PRS), and a channel state information-reference signal (CSI-RS). It should be note that the reference signal may be any down-link reference signal existing in the art or to be developed in the future. In some embodiments, the first time-frequency resource is selected from a set of first time-frequency resources allocated for transmission of the reference signal.

At block 720, the terminal device 120 may determine, from a set of second time-frequency resources allocated for the downlink control channel, a subset of second time-frequency resources based on the reference signal. In some embodiments, the first time-frequency resource may be time-division multiplexed with the second time-frequency resource.

In some embodiments, the terminal device 120 may determine a first predetermined parameter of the reference signal, determine a second predetermined parameter associated with the subset of second time-frequency resources based on the first predetermined parameter, and determine, from the set of second time-frequency resources, a second time-frequency resource having the second predetermined parameter as one in the subset of second time-frequency resources.

In some embodiments, the first predetermined parameter may comprise at least one of: a sequence of the reference signal, a cyclic shift of the sequence of the reference signal, and a time-frequency resource of the reference signal. In some embodiments, the sequence of the reference signal may comprise at least one of: an index of the sequence of the reference signal, a length of the sequence of the reference signal, an initial value of the sequence of the reference signal, an index of a base sequence group for the sequence of the reference signal, an index of a base sequence within the base sequence group, and an RE offset for mapping of the sequence.

In some embodiments, the second predetermined parameter may comprise at least one of: an aggregation level of the second time-frequency resource, a starting index of control channel elements for the second time-frequency resource, an index of the second time-frequency resource, an index of the set of the second time-frequency resources, an index of a search space associated with the terminal device 120, and an index of a set of search spaces associated with the terminal device 120.

At block 730, the terminal device 120 may receive DCI via the subset of second time-frequency resources. In this way, a range of a blind detection of the downlink control channel associated with the terminal device 120 can be reduced, and complexity on the blind detection can also be reduced.

FIG. 8 illustrates an example method 800 of communication implemented at a network device in accordance with some embodiments of the present disclosure. For example, the method 800 may be performed at the network device 110 as shown in FIG. 1. For the purpose of discussion, in the following, the method 800 will be described with reference to FIG. 1. It is to be understood that the method 800 may include additional blocks not shown and/or may omit some blocks as shown, and the scope of the present disclosure is not limited in this regard.

As shown in FIG. 8, at block 810, the network device 110 may determine a first time-frequency resource allocated for transmission of a reference signal for a downlink control channel associated with a terminal device and a second time-frequency resource allocated for the downlink control channel. In some embodiments, the first and second time-frequency resources may be predetermined. In some embodiments, the first time-frequency resource may be selected from a set of first time-frequency resources allocated for transmission of the reference signal. In some embodiments, the second time-frequency resource may be selected from a set of second time-frequency resources allocated for the downlink control channel.

At block 820, the network device 110 may determine the reference signal based on the second time-frequency resource. In some embodiments, the network device 110 may determine a second predetermined parameter of the second time-frequency resource, determine a first predetermined parameter of the reference signal based on the second predetermined parameter, and generate the reference signal based on the first predetermined parameter.

In some embodiments, the first predetermined parameter may comprise at least one of: a sequence of the reference signal, a cyclic shift of the sequence of the reference signal, and a time-frequency resource of the reference signal. In some embodiments, the sequence of the reference signal may comprise at least one of: an index of the sequence of the reference signal, a length of the sequence of the reference signal, an initial value of the sequence of the reference signal, an index of a base sequence group for the sequence of the reference signal, an index of a base sequence within the base sequence group, and an RE offset for mapping of the sequence.

In some embodiments, the second predetermined parameter may comprise at least one of: an aggregation level of the second time-frequency resource, a starting index of control channel elements for the second time-frequency resource, an index of the second time-frequency resource, an index of the set of the second time-frequency resources, an index of a search space associated with the terminal device, and an index of a set of search spaces associated with the terminal device.

At block 830, the network device 110 may transmit the reference signal and downlink control information via the first and second time-frequency resources respectively. In some embodiments, the first time-frequency resource may be time-division multiplexed with the second time-frequency resource.

The implementations of the methods described in FIGS. 7 and 8 substantially correspond to the processes described in connection with FIG. 2, and thus other details are not repeated here. With the methods 700 and 800 according to embodiments of the present disclosure, a range of a blind detection of a downlink control channel associated with a terminal device can be reduced, and complexity on the blind detection can also be reduced. In the meanwhile, with a single carrier based downlink control channel structure, a low PAPR and better coverage can be achieved.

FIG. 9 is a simplified block diagram of a device 900 that is suitable for implementing embodiments of the present disclosure. The device 900 can be considered as a further example implementation of the network device 110 or the terminal device 120 as shown in FIG. 1. Accordingly, the device 900 can be implemented at or as at least a part of the first network device 110 or the terminal device 120.

As shown, the device 900 includes a processor 910, a memory 920 coupled to the processor 910, a suitable transmitter (TX) and receiver (RX) 940 coupled to the processor 910, and a communication interface coupled to the TX/RX 940. The memory 910 stores at least a part of a program 930. The TX/RX 940 is for bidirectional communications. The TX/RX 940 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 930 is assumed to include program instructions that, when executed by the associated processor 910, enable the device 900 to operate in accordance with the embodiments of the present disclosure, as discussed herein with reference to FIGS. 1 to 8. The embodiments herein may be implemented by computer software executable by the processor 910 of the device 900, or by hardware, or by a combination of software and hardware. The processor 910 may be configured to implement various embodiments of the present disclosure. Furthermore, a combination of the processor 910 and memory 920 may form processing means 950 adapted to implement various embodiments of the present disclosure.

The memory 920 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 920 is shown in the device 900, there may be several physically distinct memory modules in the device 900. The processor 910 may be of any type suitable to the local technical network, and may include one or more of general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 6 to 11. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method of communication, comprising:

generating a sequence of a reference signal based on an initial value of the sequence of the reference signal; and transmitting, to a terminal device, the reference signal via a first resource and a first channel via a second resource different from the first resource, wherein:

the reference signal is a demodulation reference signal for the first channel comprising control information, and the initial value of the sequence of the reference signal is determined based on cyclic redundancy check (CRC) on a physical control channel associated with the first channel.

2. The method of claim 1, wherein the first resource is selected from a set of first resources allocated for transmission of the reference signal.

3. The method of claim 1, wherein the second resource is selected from a set of second resources allocated for the channel.

4. The method of claim 1, wherein the parameter comprises at least one of: an aggregation level of the channel, a starting index of control channel elements for the channel, an index of the second resource, an index of a search space associated with the channel, and an index of a set of search spaces associated with the channel.

5. The method of claim 1, wherein the first resource is time-division multiplexed with the second resource.

6. A method of communication, comprising:

determining a first resource and a second resource, and receiving, at a terminal device, a reference signal via the first resource and a first channel via the second resource different from the first resource, wherein:

a sequence of the reference signal is determined based on an initial value of the sequence of the reference signal, the reference signal is a demodulation reference signal for the first channel comprising control information, and the initial value of the sequence of the reference signal is determined based on cyclic redundancy check (CRC) on a physical control channel associated with the first channel.

7. The method of claim 6, wherein the first resource is selected from a set of first resources allocated for transmission of the reference signal.

8. The method of claim 6, wherein the first resource is time-division multiplexed with the second resource.

9. The method of claim 6, wherein the parameter comprises at least one of: an aggregation level of the channel, a starting index of control channel elements for the channel, an index of the second resource, an index of a search space associated with the channel, and an index of a set of search spaces associated with the channel.

10. A terminal device, comprising a processor configured to cause the terminal device to: determine a first resource and a second resource, and receive a reference signal via the first resource and a first channel via the second resource different from the first resource, wherein:

a sequence of the reference signal is determined based on an initial value of the sequence of the reference signal, the reference signal is a demodulation reference signal for the first channel comprising control information, and the initial value of the sequence of the reference signal is determined based cyclic redundancy check (CRC) on a physical control channel associated with the first channel.

\* \* \* \* \*